United States Patent Office 3,055,838
Patented Sept. 25, 1962

3,055,838
METHOD OF REGENERATING A DEGRADED SOLUTION, INCLUDING AN AUTOXIDIZABLE QUINONE
John W. Moore, Corpus Christi, Tex., assignor, by mesne assignments, to Pittsburgh Plate Glass Company
No Drawing. Filed Dec. 6, 1957, Ser. No. 700,944
2 Claims. (Cl. 252—182)

This invention relates to the manufacture of hydrogen peroxide by methods involving the alternate hydrogenation of a quinone such as anthraquinone to produce the corresponding quinol or hydroquinone, followed by reaction of the resulting quinol with oxygen to free hydrogen peroxide and regenerate the quinone. This hydrogen peroxide is then extracted from the regenerated quinone, for example, by water, and the resulting quinone, with or without purification, is used in subsequent hydrogenation and oxidation steps for regeneration of further hydrogen peroxide.

In the performance of this process, the hydrogenation and oxidation steps are conducted in a working solution of the quinone or quinol as the case may be. This working solution is repeatedly circulated in a cyclic process and sequentially subjected to catalytic hydrogenation to produce the quinol, followed by reaction with oxygen to free hydrogen peroxide and regenerate the quinone. The continued ability of the working solution and particularly its active components, e.g., the quinone and quinol, to synthesize hydrogen peroxide is of considerable importance to the economic operation of the cyclic process.

Continued recycling of the working solution in this process results in the gradual degradation of its hydrogen peroxide synthesizing capacity. Eventually, the solution's hydrogen peroxide synthesizing capacity diminishes to the point where the quantity of hydrogen peroxide which may be synthesized during a single cycle of the reaction system becomes impractically small. Hence, a fresh charge of working solution (or active components) is required.

According to the present invention, a novel process is provided for revitalizing or restoring to a substantial degree the hydrogen peroxide synthesizing capacity of a degraded working solution. Inasmuch as the quinones are expensive, the amount of hydrogen peroxide manufactured from a given quantity of quinone has an important bearing on the economics of the process.

It has now been discovered in accordance with the present invention that when degraded working solutions (e.g. working solutions which have had their hydrogen peroxide synthesizing capacities diminished through use in the cyclic hydrogen peroxide process of the described character) are subjected to a temperature in excess of 50° C., preferably to a temperature of 115 to 200° C., in the presence of a porous alumina-silica ($Al_2O_3.SiO_2$ containing compositions) such as sodium aluminum silicate, an increase is realized in their hydrogen peroxide synthesizing capacity. Under ideal conditions, this restores the major portion of the original hydrogen peroxide synthesizing capacity.

The exact cause for the degradation of the working solution is not clearly understood. Suffice to say, an observable degree of degradation in the hydrogen peroxide synthesizing capacity of the working solution occurs. The degradation to which the present treatment has relevance is to be distinguished from the formation of tetrahydroanthraquinones. These tetrahydroanthraquinones are capable of synthesizing hydrogen peroxide, and although not necessarily equivalent in this respect to their corresponding anthraquinones, still may be employed in the working solution for the manufacture of hydrogen peroxide. The degradation herein rectified is a consequence of the formation of products other than tetrahydroanthraquinones.

Porous aluminum silicates perform a catalytic function in this treatment. Any porous aluminum silicate (alumina-silica) is useful. Other oxides may also be present including sodium oxide, magnesium oxide, calcium oxide, mixtures thereof and the like. Among these eminently satisfactory alumina-silicas are hydrated, amorphous sodium aluminum silicates having a chemical composition corresponding to the formula:

$$Na_2O.yAl_2O_3.zSiO_2$$

wherein $y$ may range from 0.5 to 3, and $z$ may range from 0.5 to 10. These alumina-silicas also may contain water, a portion of which may be removed by heating at about 205° C. They also may contain water which is removed only at ignition temperatures, e.g. 1000° C. to 1200° C. The latter water is clearly most intimately associated with the alumina-silica.

As indicated, a minimum temperature of 50° C. is advisable. Preferably, temperatures from 100° C. to 200° C. are used since at higher temperatures the rate of regeneration is somewhat enhanced. By application of superatmospheric pressure, even higher temperatures at which the solvent and quinone components remain unaffected may be used, the maximum temperature being dictated by the practicalities of its use, e.g., costliness of pressure equipment, and the temperature stability of the working solution. Obviously avoided are temperatures which adversely affect the working solution.

In this regeneration treatment, the working solution may be obtained from any stage in the cyclic process above described. Since this treatment is most desirably accomplished in conjunction with facilitating the continued operation of the cyclic process, the working solution from which hydrogen peroxide has just been stripped is most aptly treated. In a large scale cyclic operation, a stream constituting a small portion of the total working solution, for example, 1 to 10 percent by volume of the total volume of the working solution in the system, may be continuously removed, regenerated and returned to the system.

Regeneration of the hydrogen peroxide synthesizing capacity of the working solution involves raising its temperature to above about 50° C. in the presence of highly porous sodium silicate. Usually, the solution is maintained at such temperatures for an extended period, often up to several days. Under these conditions, there is a noteworthy improvement. According to a further embodiment hereof, it has additionally been discovered that the degree of improvement (e.g., the extent to which the hydrogen peroxide synthesizing capacity of the working solution is restored by comparison with the capacity of fresh working solution) is even greater and/or attained more rapidly when the working solution contains a high concentration of sodium aluminum silicate. Thus, with a 20 to 40 percent concentration of sodium aluminum silicate by weight, the rate of improvement is greatly accelerated. Treatments of 1 to 15 hours are quite satisfactory. However, it is to be understood that with concentrations of sodium aluminum silicates, e.g., as low as about 1 percent sodium aluminum silicate by weight of the working solution, improvement is realized.

While it is generally most convenient to treat the degraded working solution as is, a working solution from which a portion of the solvent has been removed is susceptible of treatment. When the working solution is comprised of more than one solvent, it may sometimes be more convenient to remove one of the solvents, usually the more volatile solvent, prior to the treatment.

Practice of this invention is illustrated by the following examples:

EXAMPLE I

Two hundred milliliter portions of a degraded working solution comprising a solvent mixture of approximately 55 volume percent methylcyclohexylacetate and approximately 45 volume percent triethyl benzene containing 13.6 grams per liter of 2-ethylanthraquinone and 29.7 grams per liter of tetrahydro-2-ethylanthraquinone were treated with 8 gram portions of hydrated, non-crystalline (amorphous) sodium aluminum silicate.

This sodium aluminum silicate had a chemical composition on an alkalinity free basis and after being dried at 104.5° C. as follows:

| | Weight percent |
|---|---|
| $Na_2O$ | 10 |
| $Al_2SO_3$ | 19 |
| $SiO_2$ | 62 |
| Loss of water on ignition (1200° C.) | 9 |

The slurries were agitated by means of mechanical stirrers and then heated to 175° C. and maintained at that temperature by gentle refluxing. The change in synthesizing capacity of the working solution was determined by analyzing aliquots of the treated solution to determine their total quinone content (including ethylanthraquinone and tetrahydroethylanthraquinone). The increase in total quinone contents represents a conversion of otherwise non-hydrogen peroxide producing materials to components having hydrogen peroxide synthesizing properties.

Table I below lists the specific details of this experiment and results thereby obtained:

Table I

EFFECT OF TREATING DEGRADED WORKING SOLUTION WITH 40 GRAMS PER LITER OF SODIUM ALUMINUM SILICATE AT 175° C. (ATMOSPHERIC BOILING POINT)

| Reaction Time (hrs.) | Total Solids (g.p.l.) | Unknown Solids (g.p.l.) | Ethyl-anthra-quinone (g.p.l.) | Tetrahy-droethyl-anthra-quinone (g.p.l.) | Total Quinones (g.p.l.) | Conversion [1] of Unknowns (percent) |
|---|---|---|---|---|---|---|
| 0 | 101.6 | 58.3 | 13.6 | 29.7 | 43.3 | |
| 1 | 98.2 | 49.7 | 14.6 | 33.9 | 48.5 | 8.9 |
| 2 | 97.8 | 46.7 | 15.4 | 35.7 | 51.1 | 13.4 |
| 4 | 100.2 | 45.6 | 15.7 | 38.9 | 54.6 | 19.4 |
| 68 | 104.0 | 42.6 | 18.7 | 42.7 | 61.4 | 31.0 |

[1] Based on the total quinone change.
G.p.l.=grams per liter.

EXAMPLE II

Treating a working solution constituted as described in Example I above at 100° C. while it contains 320 grams per liter of sodium aluminum silicate of the type described in Example I provided increased hydrogen peroxide synthesizing capacity as indicated in Table II.

Table II

EFFECT OF TREATING DEGRADED WORKING SOLUTION WITH 320 GRAMS PER LITER OF SODIUM ALUMINUM SILICATE AT 100° C.

| Reaction Time (hrs.) | Total Solids (g.p.l.) | Unknown Solids (g.p.l.) | Ethyl-anthra-quinone (g.p.l.) | Tetrahy-droethyl-anthra-quinone (g.p.l.) | Total Quinones (g.p.l.) | Conversion [1] of Unknowns (percent) |
|---|---|---|---|---|---|---|
| 0 | 101.6 | 58.3 | 13.6 | 29.7 | 43.3 | |
| 1 | 96.3 | 47.1 | 14.8 | 34.4 | 49.2 | 10.1 |
| 2 | 96.1 | 47.0 | 13.8 | 35.3 | 49.1 | 9.9 |
| 4 | 95.7 | 42.6 | 14.1 | 39.0 | 53.1 | 16.8 |
| 7 | 95.2 | 40.1 | 15.7 | 39.4 | 55.1 | 20.2 |
| 12 | 98.6 | 40.5 | 15.9 | 42.2 | 58.1 | 25.4 |
| 20 | 99.0 | 36.0 | 16.4 | 46.6 | 63.0 | 33.8 |

[1] Based on the total quinone change.
G.p.l.=grams per liter.

EXAMPLE III

To 160 milliliters of a working solution as defined in Example I above sufficient sodium aluminum silicate was added to provide a concentration of 320 grams per liter thereof. Thereafter, flask containing such working solutions including the sodium aluminum silicate were placed in an oil bath and the contents raised to 125° C. The flasks were rotated and the contents sampled periodically.

Table III below tabulates the data and indicates the results obtained.

Table III

EFFECT OF TREATING DEGRADED WORKING SOLUTION WITH 32 PERCENT SLURRY OF SODIUM ALUMINUM SILICATE AT 125° C.

| Time, Hrs. | Total Solids (g.p.l.) | Ethyl-anthra-quinone (g.p.l.) | Tetrahy-droethyl-anthra-quinone (g.p.l.) | Un-knowns (g.p.l.) | Total Quinones (g.p.l.) | Reversion, Percent |
|---|---|---|---|---|---|---|
| 0 | 101.6 | 13.5 | 29.7 | 58.3 | 43.3 | |
| 1 | 96.0 | 15.1 | 45.9 | 35.0 | 61.0 | 30.4 |
| 2 | 97.4 | 13.2 | 50.9 | 33.3 | 64.1 | 35.7 |
| 4 | 97.5 | 14.8 | 53.2 | 29.5 | 68.0 | 42.4 |
| 68 | 102.6 | 19.3 | 56.4 | 26.9 | 75.7 | 55.6 |

G.p.l.=grams per liter.

EXAMPLE IV

Example III conditions were duplicated except that the amount of sodium aluminum silicate included in the working solution was equivalent to 40 grams per liter. The results are listed in Table IV below.

Table IV

EFFECT OF TREATING DEGRADED WORKING SOLUTION WITH A 4 PERCENT BY WEIGHT SLURRY OF SODIUM ALUMINUM SILICATE AT 125° C.

| Time, Hrs. | Total Solids (g.p.l.) | Ethyl-anthra-quinone (g.p.l.) | Tetrahy-droethyl-anthra-quinone (g.p.l.) | Un-knowns (g.p.l.) | Total Quinones (g.p.l.) | Reversion, Percent |
|---|---|---|---|---|---|---|
| 0 | 101.6 | 13.6 | 29.7 | 58.3 | 43.3 | |
| 1 | 99.5 | 14.0 | 31.9 | 53.6 | 45.9 | 4.5 |
| 2 | 101.3 | 13.9 | 32.5 | 54.9 | 46.4 | 5.3 |
| 4 | 98.3 | 14.8 | 36.2 | 47.3 | 51.0 | 13.2 |
| 7 | 96.1 | 13.6 | 39.1 | 43.4 | 52.7 | 16.1 |
| 71 | 100.2 | 15.5 | 45.3 | 39.4 | 60.8 | 30.0 |

G.p.l.=grams per liter.

The present treatment has applicability with regard to improving the hydrogen peroxide synthesizing capacity of working solutions containing as the autoxidation component or components anthraquinones, including substituted anthraquinones, and their corresponding tetrahydroanthraquinones. Typical examples include 2-ethylanthraquinone, 2-isopropylanthraquinone, 2-secondary-butylanthraquinone, 2-tertiary-butylanthraquinone, 2-secondary-allylanthraquinone, 1,2-dimethylanthraquinone, 1,3-dimethylanthraquinone, 1,4-dimethylanthraquinone, 2,7-dimethylanthraquinone and any combination thereof. Solvents comprising the working solution include naphthalenes such as 1-methylnaphthalene, benzene and the like along with and in combination with ketones, esters and alcohols such as diisobutylcarbinol. The specific nature and composition of the working solution as well as the conditions under which degradation has occurred, for example, the particular cyclic process, autoxidizable components, solvents, etc., used in providing hydrogen peroxide, may vary widely.

While the present invention has been described with reference to specific details of certain embodiments, it will be understood that the invention is not intended to be construed as limited to such specific details except insofar as they appear in the appended claims.

I claim:

1. A method of regenerating a degraded solution including an autoxidizable quinone which solution has become degraded in its hydrogen peroxide synthesizing capacity by use in an autoxidation process for synthesizing hydrogen peroxide which comprises heating at a temperature of at least 50° C. such degraded solution, which solution contains 20 to 40 percent by weight of porous hydrated amorphous sodium aluminum silicate having a chemical composition corresponding to the formula $$Na_2O \cdot yAl_2O_3 \cdot zSiO_2$$

wherein $y$ is a value from 0.5 to 3 and $z$ is a value from 0.5 to 10.

2. A method of regenerating a degraded solution including an autoxidizable quinone which solution has become degraded in its hydrogen peroxide synthesizing capacity by use in an autoxidation process for synthesizing hydrogen peroxide which comprises heating at from 115° C. to 200° C. such degraded solution, which solution contains 20 to 40 percent by weight of porous hydrated amorphous sodium aluminum silicate having a chemical composition corresponding to the formula $$Na_2O \cdot yAl_2O_3 \cdot zSiO_2$$

wherein $y$ is a value from 0.5 to 3 and $z$ is a value from 0.5 to 10.

References Cited in the file of this patent

UNITED STATES PATENTS 2,739,875   Sprauer et al. _____ Mar. 27, 1956

FOREIGN PATENTS 746,385   Great Britain _____ Mar. 14, 1956

OTHER REFERENCES

"Thorpe's Dictionary of Applied Chemistry," 4th Ed., 1950, vol. X, p. 370.